May 29, 1928. 1,671,195

H. KOPPERS

RETORT OVEN

Filed Aug. 31, 1921 2 Sheets-Sheet 1

Inventor:-
Heinrich Koppers
By:- Munday Clarke & Carpenter Attys:-

May 29, 1928. 1,671,195
H. KOPPERS
RETORT OVEN
Filed Aug. 31, 1921 2 Sheets-Sheet 2
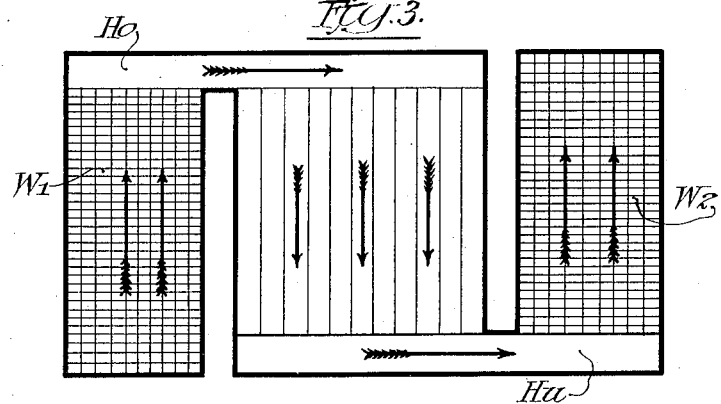
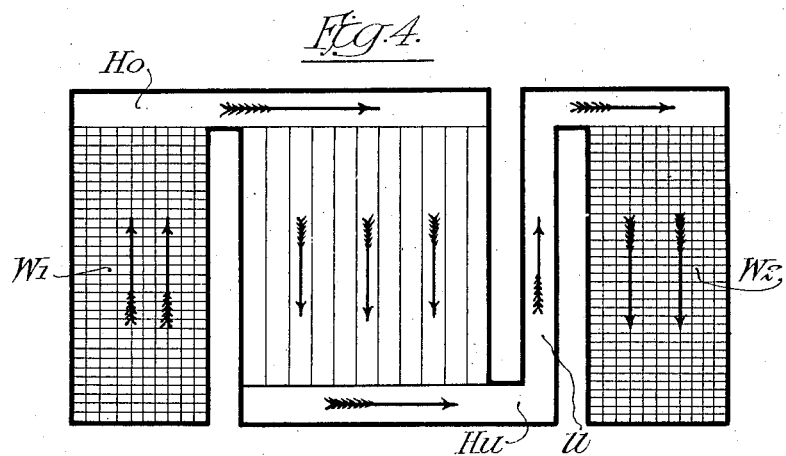
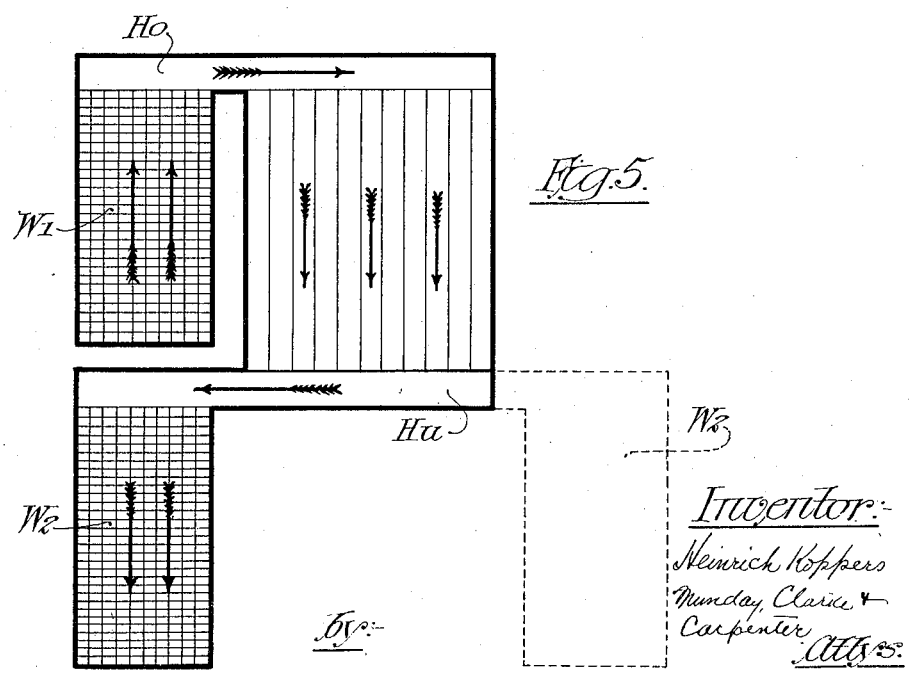

Patented May 29, 1928.

1,671,195

UNITED STATES PATENT OFFICE.

HEINRICH KOPPERS, OF ESSEN-RUHR, GERMANY, ASSIGNOR TO THE KOPPERS DEVELOPMENT CORPORATION, OF PITTSBURGH, PENNSYLVANIA, A CORPORATION OF PENNSYLVANIA.

RETORT OVEN.

Application filed August 31, 1921, Serial No. 497,366, and in Germany March 4, 1919.

(GRANTED UNDER THE PROVISIONS OF THE ACT OF MARCH 3, 1921, 41 STAT. L., 1313.)

The invention relates to furnace plants with vertical distillation chambers.

In distillation furnaces with vertical furnace chambers or retorts and heat recovery the unitary assemblage of the chambers and their heating walls or flues with the regenerators cause constructional and operative difficulties of a technical kind while these considerations, for horizontal furnace chambers, are solved in an entirely satisfactory way, for example by German Patent 174,323 (United States Patent 818,033). In German Patents 193,627, and 199,103 (United States Patent 925,815) such furnace plants are disclosed in which the regenerators are connected to U-shaped heating channels traversed, with draft reversals, by the air to be preheated, while the gas, without reversal, is led to the bend of the heating channels so that combustion takes place at any time in one branch only of the heating channels. In such arrangement, however, influencing of the heating in accordance with the different horizontal zones or strata is excluded, as obviously in the same furnace plant only the open side of the bend can lie either upwards or downwards, so that the region of strongest heating is fixed once for all.

In the construction according to the German Patent 275,329 (United States Patent 1,125,345) it is attempted to make possible such a regulation of the heating in accordance with the different horizontal zones or strata by connecting the regenerators arranged alongside the vertical furnace chambers to these latter by horizontal heating channels. Now in the first place, such horizontal heating channels possess certain purely construction defects as regards the structural strength of the furnace and moreover they are not so conveniently accessible for regulation and control, as vertical heating channels. Even where this accessibility is created, as in the Patent of Addition 275,699, (United States Patent 1,134,683), there is still the fact that in this basic arrangement the regenerators themselves are incorrectly fired in that they have to be traversed by essentially horizontal currents of both the substances to be preheated and by the waste heat. The axiom for flame control in such chambers, where no compulsory paths can be prescribed for the gases, which must find their own way through the chamber filled with the fireproof checkerwork, starts with allowing the waste heat gases to flow downwards from top to bottom and the combustion substances to be preheated to flow upwards from bottom to top, because in this way uniform stressing of the fireproof checkerwork is caused.

The invention relates to such a furnace plant with vertical distillation chambers and directly connected regenerators, in which the regenerators are traversed as prescribed, upwardly by the fuels to be preheated and downwardly by the waste heat gases, and moreover vertical heating channels are used which have structural advantages. These heating channels, which are best arranged so as to separate pairs of associated furnace chambers, are connected at the upper end with a common horizontal channel at the upper end of one of the regenerators or of one regenerator group, while the horizontal channel uniting said heating channels at the lower end is also in communication, by means of a guiding channel, with the upper end of the other regenerator or of the other regenerator group. It is here of purely illustrative significance that thereby a certain asymmetry is introduced in the otherwise symmetric construction of the whole furnace plant. With this arrangement the desired control of the strength of heating at different level layers becomes possible in as far as now, with the reversal of the heating and the resulting reversed flame direction in the heating wall, viz, one time from top to bottom and the other time from bottom to top, a certain inequality can be brought in, by which at any time in one case more gas is supplied than in the other, without however the mode of operation of the regenerator plant being altered. By this means more heat can be supplied as needed to the upper or the lower end of the furnace chambers, according to the observed requirements. This is important in as much as, in intermittently operated furnace chambers for example, which diverge rapidly in conical fashion downwards, there must obviously be supplied more heat to the lower part, while on the contrary in furnace plants with continuous operation the greatest heat development must take place at the top, in order to degasify as far as possible at once the fresh coal filled in and to convert the coke.

In the accompanying drawings a constructional example of the subject matter of the invention is reproduced, for purposes of illustration and explanation but not to limit the invention to details, in which drawings—

Figure 1:
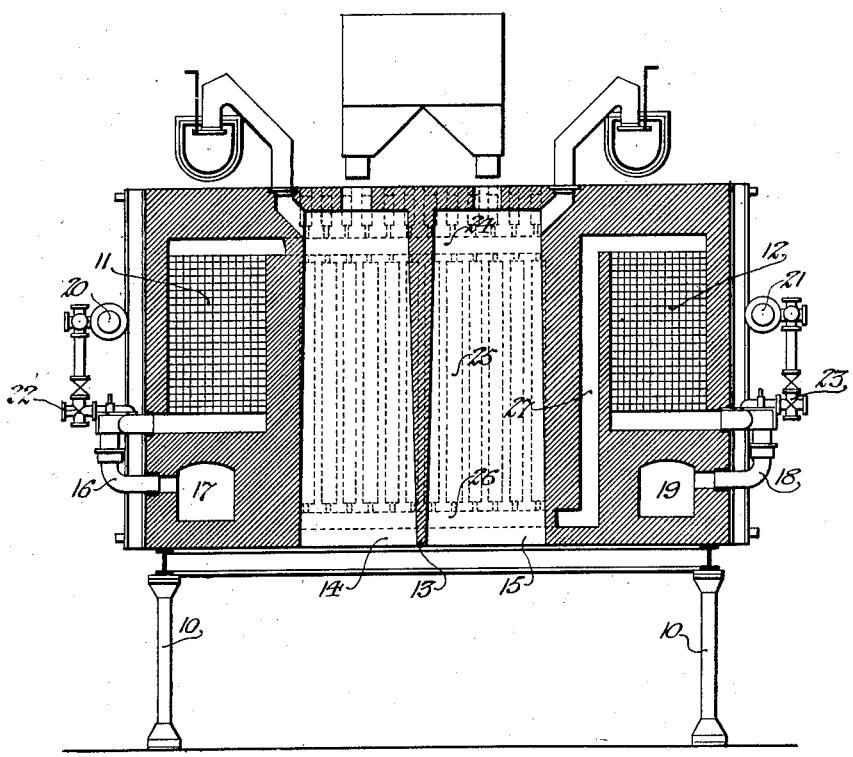
Fig. 1 is a vertical cross section of a furnace or oven embodying the invention.

Figs. 3 to 5 are diagrammatic vertical sections of different arrangements of the heating chambers and regenerators, indicating the flow through the regenerators $W'$, $W^2$, which are successively reversed, and connect with the channels $Ho$, $Hu$ and $u$. Fig. 3 shows the hereinafter mentioned objectionable arrangement of operating one of the regenerators in abnormal manner, i. e., with the waste gases flowing from bottom to top of the regenerator $W^2$ and with the fuel gases drawn from top to bottom of the same regenator during the reversal period in which it is serving to preheat such fuel gases. Fig. 4 shows the arrangement employed in the invention illustrated in Figs. 1 and 2. Fig. 5 illustrates that arrangement in which the directions of flow, in the regenerators and in the vertical flame flues, are the same as in Fig. 4, but with omission of the guide channel $u$ and consequent necessity of locating one of the regenerators below the level of the bottoms of the flame flues.

Figure 2:
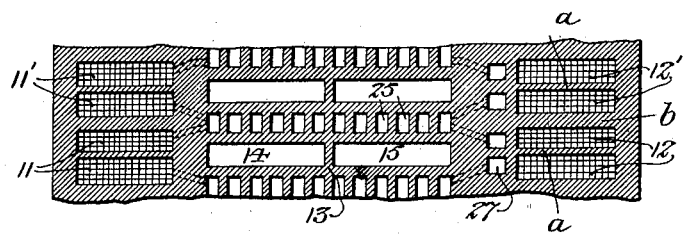
Fig. 2 is a horizontal diagrammatic section of a portion of the same.

On the frame 10 providing convenient access to the lower opening of the furnace chamber are constructed the regenerators 11 and 12 at the side of the two distillation chambers or retorts 14 and 15 separated by an intermediate partition 13. The regenerators 11, 11′ (Fig. 2) have connections 16 with the waste heat channel 17 and the regenerators 12, 12′ have similar connections 18 with the waste heat channel 19. The gas conduits 20 and 21 are connected always alternately by connections 22 and 23 to the separate regenerators 11 and 12, and the regenerators 11′ and 12′, respectively arranged in pairs alongside one another and separated by a thin wall $a$, serve for preheating air, while they are separated from the adjoining gas heaters by a thick supporting wall $b$ (Fig. 2). The regenerators of the one side are connected at the upper end to a horizontal channel 24, from which the vertical heating passages 25 lead to the lower horizontal channel 26, which again is connected by a guide channel 27 with the upper end of the other regenerator group.

In the one stage of operation therefore gas and air enter respectively the regenerators 11 and 11′ of the one side, are preheated therein, and pass into the upper horizontal channel 24 and burn downwardly through the heating channels 25; the waste heat gases are led back through the channels 26 and 27 to the regenerators 12 and 12′, which they traverse from top to bottom, and pass through all the open connections 18 into the waste heat channel 19. With draft reversal operated at about half hour intervals the functions of the regenators and the direction of flow are reversed. It is at once seen that here, by strengthening the firing on the one side, the greater heat supply can be applied either to the lower or to the upper end of the retorts. In every case it is possible to carry out a regulation while working, in accordance with the observation of the operation. The heating channels 25 can be made of such large cross section that the burning takes place with sufficient slowness to heat the long heating channels. The weakening of the heat supply at the upper end of the retorts, which is moreover desirable in view of the withdrawal of the distillation gases undecomposed, can also be effected by shutting off the gas periodically in the heating stage with flow of gases from top to bottom.

With continuous operation of the furnace chambers, where not only is no uniform heating towards the top with gradual increase downwards required, but on the contrary, a local strengthening at the upper end of the retort, an equalization can also be effected by allowing steam to flow in to the retort from the bottom whereby the excess heat given up to the coke in the lower part of the chamber is usefully employed in forming water gas. The introduction of steam is indeed quite commonly known even in continuously operated furnace chambers, but in all cases there is obtained, in connection with the present furnace construction, the special effect that on the whole the heat supply is adapted to requirements. Also the regenerative heating plays a special part in this case, in that on the whole a higher temperature stage is attained, so that in the first place a larger amount of heat is available for water gas production and moreover this reaction takes place at a higher temperature. This latter is very important because on this account the production of water gas is always more perfect. Thereby a significant improvement in illuminating gas is made for the future, which according to all anticipation, will consist usually of a mixture of coal distillation gas and water gas produced from coke.

Structurally the further valuable possibility is obtained that by anchoring the whole furnace block the strains to be taken up can be directly supported, and the thick partition between the regenerators can be given different functions by locating it in the intermediate plane between the individual furnace chambers whereby a direct pressure transmission is possible.

What is claimed is—

1. An oven plant having, in combination: vertical retort chambers; parallel vertical heating-flues; regenerators so arranged that the combustion gases being preheated flow through them from bottom to top and that the off-going waste gases flow through them from top to bottom; an upper horizontal channel directly connecting the said vertical heating-flues with the top of one of the regenerator groups; and a lower horizontal channel and a guide channel so arranged that said vertical heating-flues are connected by said lower horizontal channel and through said interposed guide channel with the top of the other regenerator group.

2. A furnace plant having in combination: vertical retorts; groups of regenerators traversed from bottom to top by the fuels to be preheated and from top to bottom by the waste gases; parallel vertical heating channels arranged alongside said retorts; upper horizontal channels connecting the upper ends of said heating flues with the upper ends of one group of regenerators; horizontal channels connecting the lower ends of said flues with a guide channel communicating with the upper ends of the other group of regenerators.

3. The method of operating a coke oven plant having vertical retort chambers, parallel vertical heating-flues, two groups of regenerators so arranged that the combustion gases being preheated flow through them from bottom to top and that the off-going waste gases flow through them from top to bottom, an upper horizontal channel directly connecting the said vertical heating-flues with the top of one of the regenerator groups, and a lower horizontal channel and a guide channel so arranged that said vertical heating-flues are connected by said lower horizontal channel and through said guide channel with the top of the other regenerator group, said method of operating comprising: continuously downflowing through said chambers a charge being coked in same; supplying substantially the same amount of heat at the lower ends of the vertical flues that is supplied at their upper ends by firing alternately upwardly and downwardly at the bottom and at the top of said flues respectively, so that substantially the same amount of waste heat flows off in alternation through the respective regenerator groups during both directions of firing of such flues; and absorbing the heat supplied at the lower portion of the retort chambers, over and above that necessary for completing the coking of the descending charge, by supplying steam thereto for production of water gas which flows upwardly through said descending charge and off with the gaseous distillate from the upper portion of the charge.

4. A coke oven comprising, in combination: vertical retorts; substantially vertical heating-flues for said retorts; fuel gas supply means connected to said flues at their upper ends; fuel gas supply means connected to said flues at their lower ends; and reversible regenerators communicably connected with said vertical flues and operable in alternation for supply of preheated combustion gases to and for exhaust of waste gas from said flues a regenerator being connected at its upper part to each of said flues at substantially their lower ends, and a regenerator connected at its upper part to each of said flues at substantially their upper ends; whereby each of said vertical flues may be fired upwardly from their lower ends and downwardly from their upper ends in alternation.

5. A coke oven having in combination: a plurality of vertical retort chambers; parallel vertical heating flues intermediate pairs of associated vertical retorts; two groups of reversible regenerators operable for inflow of combustion gases and outflow of waste gas, said regenerators being so arranged that the combustion gases being preheated may flow through them from bottom to top and that the off-going waste gases may flow through them from top to bottom; flow duct means connecting each of said heating flues at their upper ends with a pair of regenerators of one group at the upper parts of said pair of regenerators; flow duct means connecting each of said heating flues at their lower end with a pair of regenerators of the other group at the upper parts of said pair of regenerators, said pairs of regenerators being constituted of an air regenerator and a gas regenerator when the flow is through them from bottom to top, whereby each of said flues may be fired upwardly from their lower ends and downwardly from their upper ends in alternation.

In testimony whereof, I have hereunto set my hand this 25th day of July, 1921.

HEINRICH KOPPERS.